March 21, 1967 W. HALPERN 3,309,945
CUTTING TOOL
Filed May 13, 1965 2 Sheets-Sheet 1
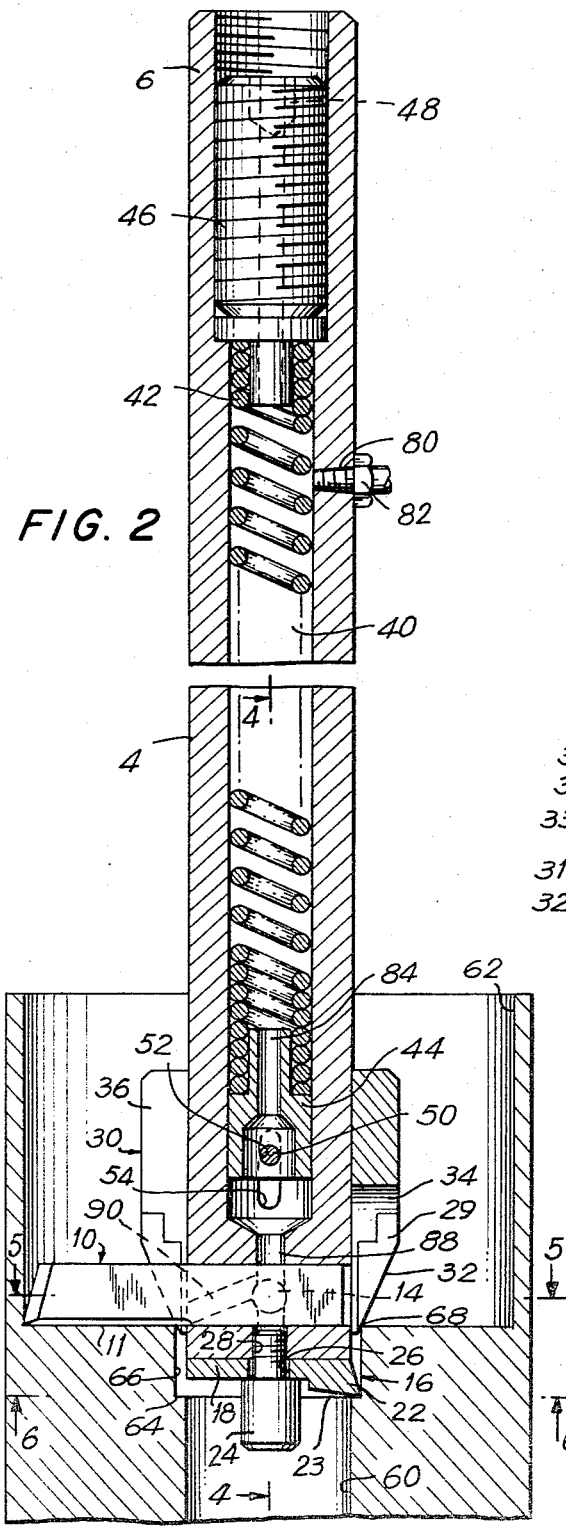
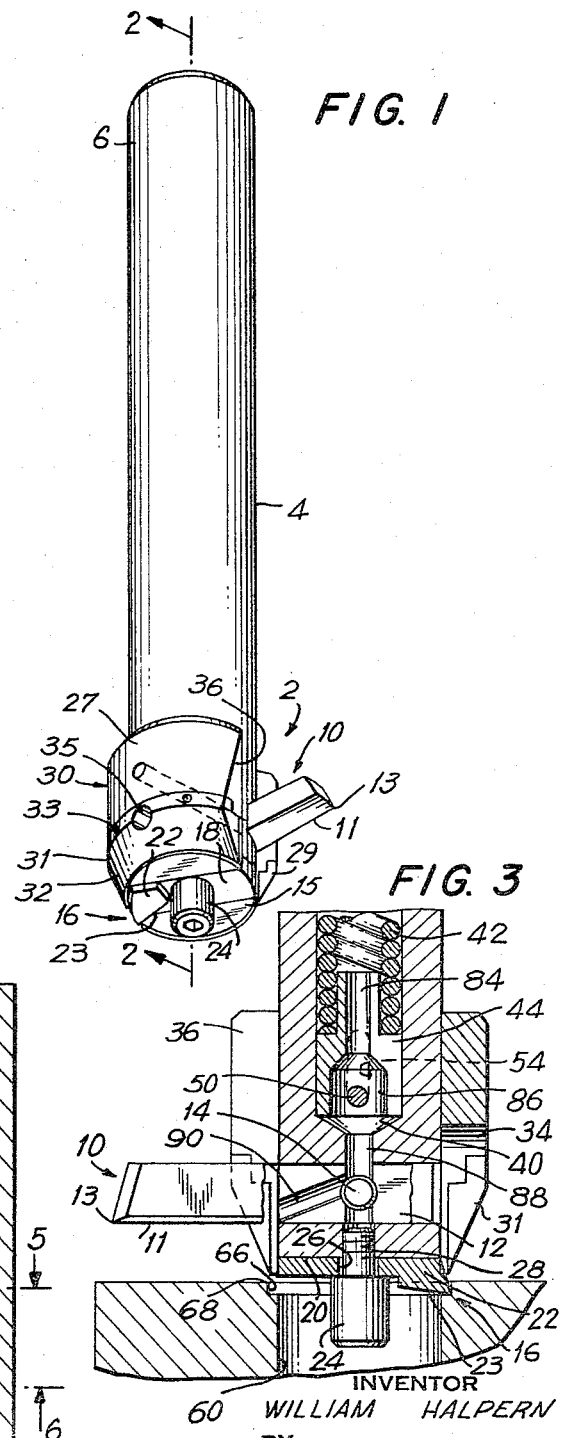
INVENTOR
WILLIAM HALPERN
BY
Curtis, Morris & Safford
ATTORNEYS March 21, 1967  W. HALPERN  3,309,945
CUTTING TOOL Filed May 13, 1965  2 Sheets-Sheet 2

INVENTOR
WILLIAM HALPERN
BY
Curtis, Morris + Safford
ATTORNEYS

3,309,945
CUTTING TOOL
William Halpern, Haviland Road,
Harrison, N.Y. 10528
Filed May 13, 1965, Ser. No. 455,447
14 Claims. (Cl. 77—58)

This invention relates to boring tools, and more in particular to tools for enlarging bores or holes in workpieces.

An object of this invention is to provide improved boring tools and the like. Another object is to provide improved metal working tools which are adapted to form holes of varying diameters and depths and with very accurate control. Another object is to provide efficient and dependable boring tools which may be used to enlarge cylindrical holes of relatively great depth and to maintain close tolerances from the standpoint of the location, size, and condition of the surface of the wall of the finished hole. Another object is to provide improved boring tools which are versatile in the senses that a single tool may produce holes of a wide range of diameters and depths. A further object is to provide tools of the above character which will produce holes of great accuracy, even though an original hole has been formed which is somewhat inaccurate in its location or size, or the relative angle of its axis. These and other objects will be in part obvious and in part pointed out below.

In the drawings in which one embodiment of the invention is shown:

FIGURE 1 is a perspective view of a boring tool;

FIGURE 2 is a side elevation of the boring tool of FIGURE 1 with the tool operating to enlarge a hole in a workpiece;

FIGURE 3 is a view similar to the lower portion of FIGURE 2, but with the tool positioned at the start of its boring operation;

Figure 5:
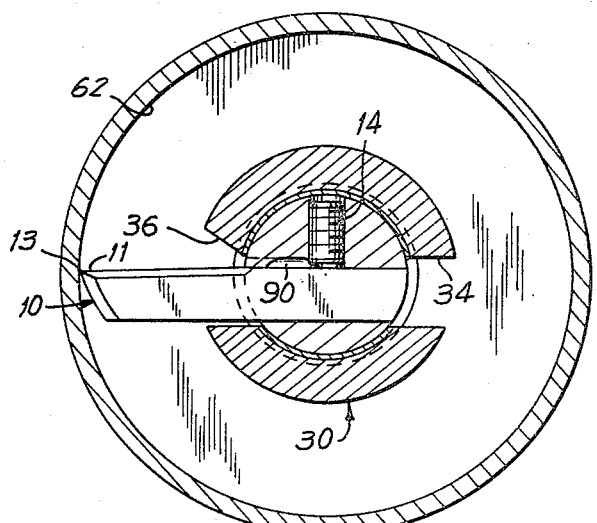
Figure 4:
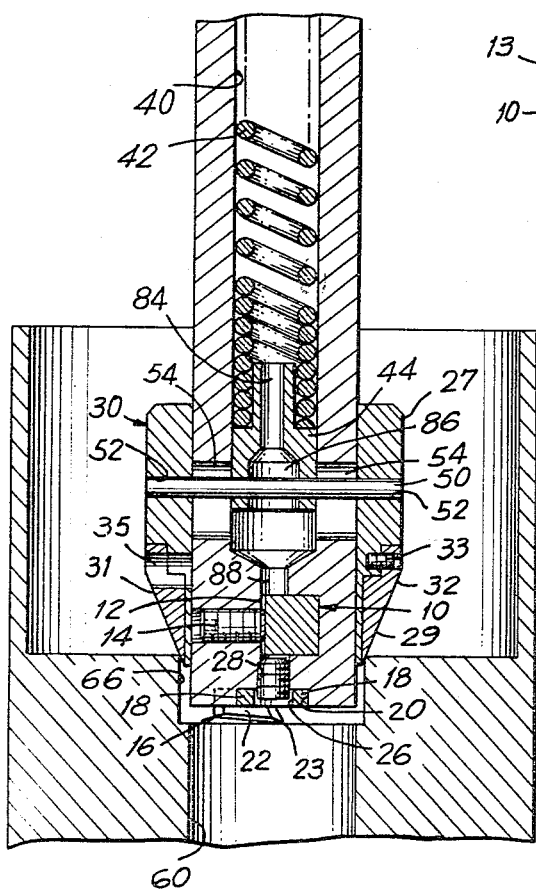
Figure 6:
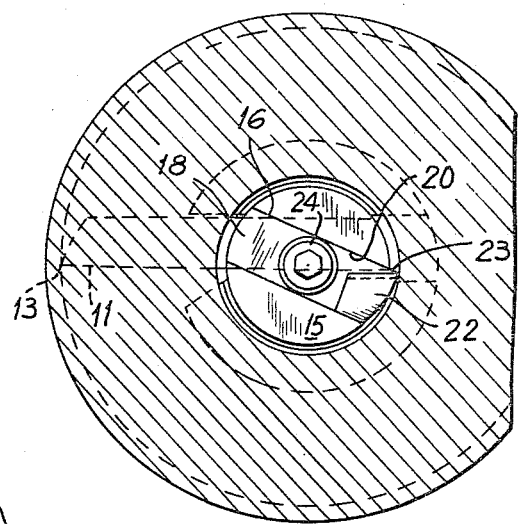
Figure 7:
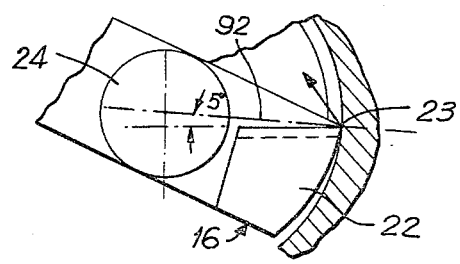

FIGURES 4, 5, and 6 are sectional views on the lines 4—4, 5—5, and 6—6, respectively, of FIGURE 2; and, FIGURE 7 is an enlarged view of the central portion of FIGURE 6.

Referring to FIGURE 1 of the drawings, a boring tool 2 has a boring bar 4 which is adapted to be mounted at its upper end 6, either for rotation when the workpiece is stationary, or stationary when the workpiece is rotated. Mounted upon the lower end of boring bar 4 is the boring assembly 8 having a boring bit 10 (see also FIGURE 4) which is mounted in a transverse slot 12 in the boring bar and is clamped in adjusted position by a set screw 14. Boring kit 10 has a cutting edge 11 terminating at 13 at a circular release. Mounted on the bottom end face 15 of boring bar 4 is an end-cutting boring bit 16 having a rectangular bar portion 18 which is snugly received in a slot 20 in the boring bar and an integral bit 22 having a cutting edge 23. End cutting boring bit 16 is clamped in place by a headed screw 24 which (FIGURE 4) extends through a central bore 26 in the bar portion 18 and is threaded into an axial bore 28 in the boring bar.

Mounted upon and surrounding the lower end of boring bar 4 is a nose cone 30 which is tapered at its lower end to form a frusto-conical surface 32. Nose cone 30 is formed by a steel sleeve 27 and a pair of carbide inserts 29 and 31 which are rigidly attached to sleeve 27 by screws 33, and which form the frusto-conical surfaces 32. Nose cone 30 is generally cylindrical with uniform wall thickness, and it has at the right (FIGURE 3) a slot 34 extending from the bottom above boring bit 10, and a slot 36 at the left extending from the bottom to the top. There is also a hole 35 through which a screw driver may be inserted to turn set screw 14. Slots 34 and 36 permit free axial movement of the nose cone with respect to the boring bit, and slot 36 acts to guide and discharge the chips upwardly during the boring operation.

Referring now to FIGURE 4, boring bar 4 is tubular with a cylindrical axial bore 40 within which there is a compression coil spring 42 which rests at its lower end upon a plug 44, and which is held under compression at its upper end by an adjustable screw 46 having a wrench-receiving recess 48. Extending through a transverse hole in plug 44 is a connector pin 50, the ends of which are snugly received in radial holes 52 in the opposite side walls of the nose cone. The boring bar has slots 54 which permit free movement of connector pin 50 axially of and with respect to the boring bar. Hence, the downward pressure of spring 42 is transmitted through plug 44 and connecting pin 50 to nose cone 30, but the nose cone may be moved axially with respect to the boring bar within the limits of slots 54, by and against the action of spring 42. Therefore, as will be discussed below, when the boring bar is moving axially downwardly toward a hole in a workpiece (as shown in FIGURE 4), and the nose cone stopped and held from further downward movement by engagement with the top of the hole, the boring bar may continue to move downwardly, thus nesting the frusto-conical surface 32 of the nose cone in the top of the hole under the increased compression of spring 42.

Boring bar 4 is also used to carry cooling fluid to the cutting zone of the boring bit. Accordingly, at the upper portion of the boring bar there is a threaded opening 80 into which a nipple 82 is screwed. A tube or pipe connects this nipple to a source of cooling fluid, and a rotary seal is provided when the boring bar is rotated. At the bottom of bore 40 (FIGURES 2 and 3) plug 44 has axial bores 84 and 86 which connect together and provide a passageway through the plug, bore 86 being larger so as to permit the fluid to flow around pin 50. Extending downwardly from the lower end of bore 40 there is a bore extension 88, and extending from bore extension 88 there is an angular semi-cylindrical passageway 90 which extends at an angle downwardly and radially outwardly along the side of the transverse slot 12 for the boring bit 10. Passageway 90 emerges at the side of the boring bar directly above the cutting edge 11 of the boring bit 10. Hence, the cooling fluid delivered to bore 40 near the top of the boring bar passes downwardly through bores 40, 84, and 86 to the bottom of bore 40 and then through bore 88 and passageway 90 to the cutting edge 11. During the boring operation as shown in FIGURE 2, the cooling fluid is discharged directly ahead of the cutting edge and is directed radially outwardly through the cutting zone.

In the illustrative embodiment, the workpiece has been drilled to form a relatively small hole 60, and the operation involves cutting away the metal from the workpiece to from an enlarged hole 62. However, it is important to insure that hole 62 is accurate from the standpoint of size and position, and that its axis is in exact alignment with the axis of the boring rod 4. Accordingly, the bit 16 cuts the metal away from the workpiece in a relatively narrow zone at 64 to form a hole 66 which is slightly larger in radius than hole 60. Bit 16 is held rigidly by the boring bar so that hole 66 is produced with great accuracy.

The producing of hole 66 is illustrated in FIGURE 3, which shows the tool 2 during the start of its operation. At that time, the boring bit 10 has not reached the workpiece and only the cutting bit 16 is operating. However, as the operation continues, the depth of hole 66 is increased and the lower end of the nose cone 30 moves downwardly and into the top of hole 66, and the frusto-conical surface 32 moves against the edge 68 at the top of hole 66. As the operation continues, the nose cone is held from further downward movement until the boring bit 10 reaches the top surface of the workpiece. Spring 42 is then under increased compression and it holds the nose cone firmly in place in the top of hole 66, and the frusto-conical surface 32 rotates freely upon edge 68. The boring bit 10 then starts to cut away the metal from the workpiece so as to form the enlarged hole 62, and slot 36 in the rotating nose cone directs the chips upwardly. The constantly turning nose cone moves steadily downwardly as the metal is cut away by boring bit 10 so that the nose cone remains firmly in place in the top of hole 66.

In this embodiment the frusto-conical surface 32 has an included angle of 45°, so that that surface is at an angle of 22½° from the cylindrical outer surface of the boring rod and the side wall surface of hole 66. The nose cone acts as an annular wedge which is urged downwardly by spring 42 with sufficient force to insure the operating relationship of FIGURES 2 and 4, wherein the boring assembly 8 is firmly supported at the exact center of the hole 64 and upon the top edge 68 of hole 66. The cutting edge 11 of the boring bit 10 cuts the metal from this edge 68, and therefore, firm support is provided in exact radical alignment with the zone of cutting edge. That relationship insures against side movement and other effects which would result in vibration, chattering, or other objectionable operating characteristics. That manner of support overcomes many of the difficulties which have been encountered with prior boring tools where the support is at or above the top surface of the workpiece. With such prior arrangements the tool may give acceptable results during the initial boring, but the difficulties may develop and become increasingly serious as the depth of the hole is increased.

It has been indicated above that the chips from boring bit 10 move upwardly and out of the top of the finished hole. The cutting edge 11 is slightly ahead of the radius line with which it is parallel, with the result that there is component force radially inwardly with respect to the boring axis, and the chips are deflected somewhat radially outwardly.

The end-cutting boring bit has its cutting edge 23 in trailing relationship with respect to the radius line with which it is parallel. This relationship is shown best in FIGURE 7, and for purposes of definition, cutting edge 23 is at an angle of the order of 5° from the radius line 90 which intersects the outer end of the cutting edge. The chips from cutting edge 23 are deflected somewhat radially so that they coil into hole 60 and pass downwardly as illustrated in FIGURE 4. This disposes of the chips without the difficulties which might otherwise be encountered. Cutting edge 23 also produces a component of force which tends to urge it radially outwardly with the result that the cutting edge does not tend to deflect inwardly, and it will remove an extremely thin layer of the metal. Hence, even if hole 62 is not straight and deviates substantially from the true concentric condition represented in the drawing, bit 22 will correct the inaccuracy and produces an accurate hole 66. An additional feature which may be important under some conditions of operation is that boring bits 10 and 16 produce cutting forces upon diametrically opposite sides of the axis and at different radii.

During the initial operation as represented in FIGURE 3, the boring bit 16 is supported by the rigid boring bar. That support is satisfactory to provide a high degree of accuracy at the top of the hole. As the operation continues, the nose cone moves into position as shown in FIGURES 2 and 4 and provides the support as discussed above to maintain the boring bar in accurate axial alignment. Hence, when hole 66 is greater than the axial distance between its cutting edge and the edge 68 in FIGURE 2, support is provided for boring bit 16 within a very short distance from it. Such support becomes increasingly important as bit 16 moves downwardly into the hole where there are apt to be the inaccuracies discussed above.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. A boring tool comprising, the combination of, a boring bar having a tool end which is adapted to project into a workpiece while it is supported at its other end, an end-cutting bit mounted upon said tool end of said boring bar and presenting a cutting edge which leads said boring bar in the longitudinal movement to a workpiece, said end-cutting bit being adapted to produce a hole with a cylindrical surface concentric with the axis of said boring bar, a boring bit rigidly mounted upon said tool end of said boring bar and presenting a cutting edge through a radial boring zone which extends radially from a minimum radius which is less than the maximum radius of said end-cutting bit to the maximum radius of the hole which is being bored, a nose cone having a sleeve portion slidably mounted upon said boring bar and presenting bearing surface means which is part of a frustrum of a cone and which has a minimum radius which is less than the maximum radius of said cutting edge of said end-cutting bit and a miximum radius which is greater than the maximum radius of said cutting edge of said end-cutting bit whereby said bearing surface means is adapted to be projected against and rest upon the end of the hole produced by said end-cutting bit, said nose cone being positioned with said bearing surface in trailing relationship with respect to said end-cutting bit, and resilient means resiliently urging said nose cone longitudinally of said boring bar toward a rest position wherein a portion of said bearing surface means is in leading relationship with respect to said boring bit, said resilient means permitting said boring bar to be projected longitudinally against the action of said resilient means to a position wherein the cutting edge of said boring bit intersects the cone frustrum of said bearing surface means and wherein said bearing surface means is resiliently nested in the hole produced by said end-cutting bit.

2. A boring tool as described in claim 1 wherein said resilient means comprises a coil spring mounted coaxially with respect to said boring bar, and means adjustably holding said spring under compression.

3. A boring tool as described in claim 2 which includes, seat means for said spring at the end thereof adjacent said nose cone, and a connecting rod extending diametrically with its center portion being mounted in said seat means and with its ends positioned in the opposite sides of said nose cone, said boring bar having radial slots through which said connecting rod extends.

4. A boring tool which is adapted to cut away the side wall of an original hole in a workpiece and which comprises, the combination of, a boring bar having a tool end which is adapted to project into an original hole in a workpiece while it is supported at its other end, a boring bit rigidly mounted upon said tool end of said boring bar and presenting a cutting edge which extends radially through a boring zone from a minimum radius which is less than the minimum radius of said original hole to a maximum radius which is the radius of the final hole which is being bored, a nose cone slidably mounted upon said boring bar and presenting a bearing surface means which is part of a cone frustrum and which has a minimum radius which is less than the minimum radius of said original hole and a maximum radius which is greater than the maximum radius of said original hole and less than the radius of the hole produced by the boring bit whereby said bearing surface means is adapted to be projected into the hole produced by the boring bit and against the end of said original hole, and resilient means resiliently urging said nose cone longitudinally of said boring bar toward a rest position wherein a portion of said bearing surface means is in leading relationship with respect to said boring bit, said resilient means permitting said boring bar to be projected longitudinally against the action of said resilient means to a cutting position wherein the cutting edge of said boring bit intersects the cone frustrum of said bearing surface means and wherein said bearing surface means is resiliently nested in said original hole.

5. A boring tool as described in claim 4 wherein said boring bar has an axial bore, and wherein said resilient means is a coil spring axial positioned within said bore, and means extendng radially through slots in said boring bar and mechanically connecting said nose cone to said spring.

6. A boring tool as described in claim 5 wherein said boring bar has passageways connecting said axial bore with a liquid outlet opening adjacent the cutting edge of said boring bit, and means providing a connection for supplying cooling liquid to said axial bore and thence to the cutting edge.

7. A boring tool as described in claim 4 which includes a leading bit mounted upon the leading end of said boring bar and having a cutting edge which is adapted to cut away the side wall of a previously formed hole in the workpiece to form said original hole and which directs the resulting chips radially inwardly and thence in leading relationship through the hole.

8. A boring tool as described in claim 7 wherein said leading bit comprises an end-cutting bit having a bar portion snugly received in a diametric slot and held in place by axial screw-clamping means.

9. A boring tool as described in claim 4 wherein said nose cone has a sleeve portion and a substantially frusto-conical portion, said frusto-conical portion being in axial alignment with said boring bar and said nose cone having slots in general alignment with said boring bit to permit relative axial movement between the boring bit and the nose cone, one of said slots providing a chip guide.

10. A boring tool as described in claim 9 wherein said boring bit is positioned in a diametric slot in said boring bar, and a set screw clamping said boring bar in adjusted position.

11. A boring tool as described in claim 10 wherein said boring bar has a longitudinal bore and connected passageways through which cooling liquid may be supplied to the cutting edge of said boring bit, and wherein said resilient means comprises a coil spring positioned within said longitudinal bore, and which includes a plug slidably mounted within said longitudinal bore and providing movable means against which one end of said spring rests, and a connecting pin mechanically connecting said plug to said nose cone.

12. A boring tool as described in claim 11 wherein said plug has liquid passageways therethrough, and wherein said passageways in said boring bar includes a semicylindrical passageway open to the slot for said boring bit and extending to the surface of the boring bar.

13. A boring tool which is adapted to cut away the side wall of an original hole in a workpiece and which comprises, the combination of, a boring bar having a tool end which is adapted to project into an original hole in a workpiece while it is supported at its other end, a boring bit rigidly mounted upon said tool end of said boring bar and presenting a cutting edge which extends radially through a boring zone from a minimum radius which is less than the minimum radius of said original hole to a maximum radius which is the radius of the final hole which is being bored, a nose member slidably mounted to move axially upon said boring bar, said nose member including a plurality of elongated contact portions which converge axially in the direction toward said tool end of said boring bar and present bearing surfaces which are along a cone frustrum which has a minimum radius which is less than the minimum radius of said original hole and a maximum radius which is greater than the maximum radius of said original hole whereby said bearing surfaces are adapted to be projected against and rest upon the workpiece at the edge of the end of said original hole, and means adjustably holding said nose cone longitudinally of said boring bar in a position wherein the engagement of portions of said bearing surfaces is substantially in radial alignment with said cutting edge of said boring bit.

14. In a boring tool which is adapted to cut away the side of an original hole in a workpiece, the combination of, a boring bar having a tool end which is adapted to be projected into the original hole while it is supported for relative rotary movement about its axis with respect to the workpiece, a boring bit rigidly mounted upon said tool end of said boring bar and presenting a cutting edge which extends radially through a boring zone from a minimum radius which is less than the minimum radius of the original hole to a maximum radius which is the radius of the hole which is being bored, and supporting means mounted upon said boring bar and presenting supporting surface means along a frustrum of a cone having a minimum and maximum diameter which are respectively less than and greater than the minimum and maximum diameters of the original holes with which the boring tool is to be used, and means adjustably mounting said supporting means to move axially with respect to said boring bar with limited movement substantially equal to the axial dimension of said frustrum of a cone and adapted to rest said supporting surface means on the exposed edge of the near end of the original hole substantially in radial alignment with said cutting edge of said boring bar.

References Cited by the Examiner
UNITED STATES PATENTS

| | | | |
|---|---|---|---|
| 2,283,491 | 5/1942 | Daley | 77—2 |
| 2,556,745 | 6/1951 | Zimmermann | 77—58 |
| 3,028,772 | 4/1962 | Mossberg | 77—58 |
| 3,065,655 | 11/1962 | Elias. | |

WILLIAM W. DYER, JR., *Primary Examiner.*

G. A. DOST, *Examiner.*